(12) United States Patent
Kobayashi et al.

(10) Patent No.: US 8,617,756 B2
(45) Date of Patent: Dec. 31, 2013

(54) FUEL CELL STACK

(75) Inventors: Norihisa Kobayashi, Shioya-gun (JP); Masaharu Suzuki, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 293 days.

(21) Appl. No.: 12/873,917

(22) Filed: Sep. 1, 2010

(65) Prior Publication Data

US 2011/0053033 A1 Mar. 3, 2011

(30) Foreign Application Priority Data

Sep. 2, 2009 (JP) .................................. 2009-202470
Sep. 7, 2009 (JP) .................................. 2009-205929

(51) Int. Cl.
*H01M 8/24* (2006.01)
*H01M 8/02* (2006.01)
*H01M 8/10* (2006.01)

(52) U.S. Cl.
USPC ............................ 429/434; 429/458; 429/459

(58) Field of Classification Search
USPC ......................................... 429/458, 459, 434
See application file for complete search history.

(56) References Cited

U.S. PATENT DOCUMENTS

| 6,099,716 A | * | 8/2000 | Molter et al. ................. 205/687 |
| 2006/0088740 A1 | * | 4/2006 | Sakano et al. .................. 429/12 |
| 2007/0218332 A1 | * | 9/2007 | Suzuki et al. ................... 429/26 |
| 2008/0305374 A1 | * | 12/2008 | Toro ............................... 429/26 |

FOREIGN PATENT DOCUMENTS

| JP | 2000-260439 | | 9/2000 |
| JP | 2003323905 A | * | 11/2003 |
| JP | 2006-92843 | | 4/2006 |
| JP | 2008-181783 | | 8/2008 |

OTHER PUBLICATIONS

Japanese Office Action for Application No. 2009-205929, dated Aug. 30, 2011.

* cited by examiner

*Primary Examiner* — Gregg Cantelmo
(74) *Attorney, Agent, or Firm* — Nelson Mullins Riley & Scarborough LLP; Anthony A. Laurentano

(57) ABSTRACT

A coolant supply manifold and a coolant discharge manifold are provided on a first end plate of a fuel cell stack. The coolant supply manifold includes a pair of supply manifold sections and a supply coupling section coupling upper portions of the pair of supply manifold sections together. The supply manifold sections are connected to a pair of coolant supply passages of a first end plate. The width of the coupling section is smaller than the width of the pair of supply manifold sections in a longitudinal direction along the long sides of the first end plate. A supply pipe extending to the outside of the first end plate is formed integrally with one of the supply manifold sections.

5 Claims, 12 Drawing Sheets

⇨ OXYGEN-CONTAINING GAS
⇨ COOLANT
⇨ FUEL GAS

⇨ OXYGEN-CONTAINING GAS
⇨ COOLANT
⇨ FUEL GAS

FUEL CELL STACK

CROSS-REFERENCE TO RELATED APPLICATION

This application is based upon and claims the benefit of priority from Patent Applications No. 2009-202470 filed on Sep. 2, 2009, and No. 2009-205929 filed on Sep. 7, 2009, in the Japan Patent Office, of which the contents are incorporated herein by reference.

BACKGROUND OF THE INVENTION

1. Field of the Invention

The present invention relates to a fuel cell stack formed by stacking an electrolyte electrode assembly and a pair of separators in a stacking direction, the electrolyte electrode assembly being interposed between the pair of separators. The electrolyte electrode assembly includes a pair of electrodes and an electrolyte interposed between the electrodes. Rectangular end plates are provided at both ends of the fuel cell stack in the stacking direction.

2. Description of the Related Art:

For example, a solid polymer electrolyte fuel cell employs a membrane electrode assembly (MEA) which includes an anode, a cathode, and an electrolyte membrane interposed between the anode and the cathode. The electrolyte membrane is a solid polymer ion exchange membrane. The membrane electrode assembly and separators sandwiching the membrane electrode assembly make up a unit cell. In use, generally, a predetermined number of unit cells are stacked together to form a fuel cell stack mounted in a vehicle.

Mostly, the fuel cell stack of this type adopt internal manifold structure where a fuel gas supply passage and a fuel gas discharge passage as passages of a fuel gas, an oxygen-containing gas supply passage and an oxygen-containing gas discharge passage as passages of an oxygen-containing gas, and a coolant supply passage and a coolant discharge passage as passages of a coolant extend through the unit cells in the stacking direction.

As a technique related to the internal manifold type fuel cell, for example, Japanese Laid-Open Patent Publication No. 2000-260439 is known. In Japanese Laid-Open Patent Publication No. 2000-260439, as shown in FIG. 12, a spacer 1 forming a coolant channel is provided. In a marginal area 2 of the spacer 1, holes 3 and holes 4 are formed at upper and lower positions as channels of one and other of reactant gases. A pair of holes 5a and a pair of 5b are provided on both sides of the marginal area 2 as coolant channels. The pair of holes 5a, 5b are connected to a coolant space 7 through connection channels 6.

In the fuel cell, the pair of holes 5a as the coolant supply channels may be connected together and the pair of holes 5b as the coolant discharge channels may be connected together by a single supply manifold and a single discharge manifold provided in the end plates.

For example, in the case where the supply manifold has a rectangular shape, the internal volume of the supply manifold is large. Therefore, when the coolant flows into the supply manifold through a supply pipe connected to the supply manifold, the flow rate of the coolant tends to be decreased significantly. Therefore, the pressure loss of the coolant in the supply manifold increases considerably, and a vortex flow of the coolant may be generated in the supply manifold. As a consequence, the coolant cannot be supplied suitably to the pair of holes 5a. The same problem may occur also in the discharge manifold.

Further, normally, at the center of the supply manifold, an inlet pipe for supplying the coolant into the supply manifold is provided at the center of the supply manifold. Further, an outlet pipe for discharging the coolant from the discharge manifold is provided at the center of the discharge manifold. That is, the coolant supplied into the center of the supply manifold is distributed to the pair of left and right holes 5a, and the coolant discharged from the left and right pair holes 5b are merged at the center of the discharged manifold.

However, in the structure, it is difficult to allocate the same flow rate of coolant to the pair of left and right holes 5a. Therefore, the temperature distribution in the surfaces of the fuel cell become non-uniform, and the power generation performance of the fuel cell is low.

SUMMARY OF THE INVENTION

The present invention has been made to solve the problems of this type, and an object of the present invention is to provide a fuel cell stack having simple structure which makes it possible to suitably reduce the pressure loss in a manifold, and smoothly and uniformly supply a coolant to fuel cells.

Further, another object of the present invention is to provide a fuel cell stack having simple structure where a pair of coolant supply passages have the same pressure loss, a pair of coolant discharge passages have the same pressure loss, and the same flow rate allocation is maintained to achieve the uniform temperature distribution in the surfaces of the fuel cells.

The present invention relates to a fuel cell stack formed by stacking an electrolyte electrode assembly and a separator in a stacking direction. The electrolyte electrode assembly includes a pair of electrodes and an electrolyte interposed between the electrodes. Rectangular end plates are provided at both ends of the fuel cell stack in the stacking direction.

In the present invention, the fuel cell stack comprises a pair of coolant supply passages and a pair of coolant discharge passages extending through two opposite long sides of the fuel cell stack in the stacking direction as passages of a coolant. One of the end plates includes a pair of manifold sections connected to at least any of the pair of coolant supply passages and the pair of coolant discharge passages, and a coupling section for coupling the pair of manifold sections together. The width of the coupling section along the long sides is smaller than the width of the pair of manifold sections along the long sides.

Further, in the present invention, the fuel cell stack comprises a pair of coolant supply passages and a pair of coolant discharge passages extending through two opposite long sides of the fuel cell stack in the stacking direction as passages of a coolant. One of the end plates includes a coolant supply manifold connected to the pair of coolant supply passages and a coolant discharge manifold connected to the pair of coolant discharge passages. The coolant supply manifold and the coolant discharge manifold are arranged along the long sides.

A coolant inlet pipe for supplying the coolant into the coolant supply manifold is provided on the coolant supply manifold adjacent to one of the long sides, and a coolant outlet pipe for discharging the coolant from the coolant discharge manifold is provided on the coolant discharge manifold adjacent to the other of the long sides.

In the present invention, a pair of manifold sections are coupled together by a narrow coupling section along the long sides. In the structure, the manifold does not have a rectangular shape as a whole. The internal volume and the weight (cost) of the manifold are reduced advantageously. Therefore, increase in the pressure loss of the coolant flowing into the manifold is suppressed effectively, and it becomes possible to supply the coolant to the fuel cells smoothly and uniformly.

Further, in the present invention, the coolant inlet pipe is provided adjacent to one long side of the end plate and the coolant discharge pipe is provided adjacent to the other long side of the end plate. In the structure, the pair of coolant supply passages have the same pressure loss, and the pair of coolant discharge passages have the same pressure loss.

Therefore, the same flow rate allocation is maintained in each of the pair of coolant supply passages and the pair of coolant discharge passages. Thus, the uniform temperature distribution in the surfaces of the fuel cells is achieved, and improvement in the power generation performance of the fuel cells is achieved easily.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
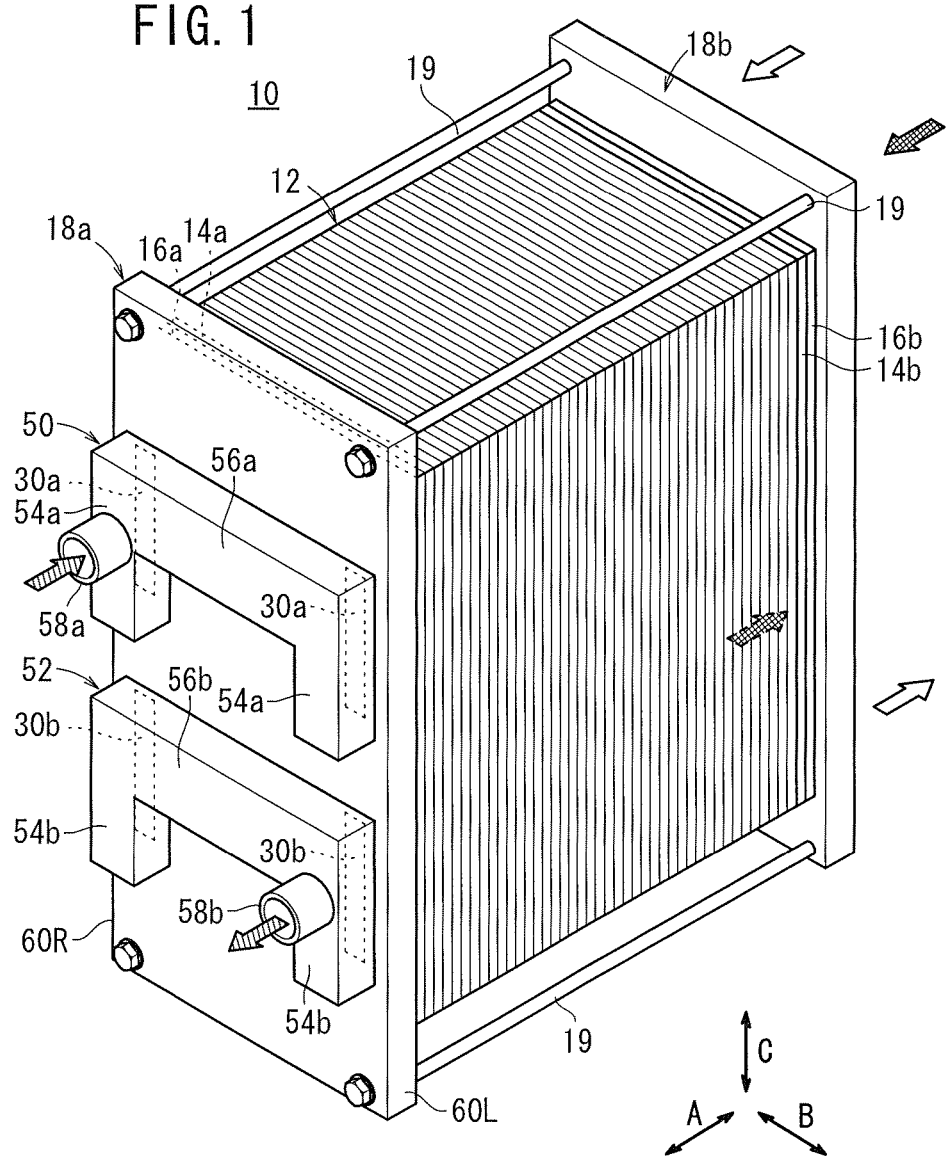
FIG. 1 is a perspective view schematically showing a fuel cell stack according to a first embodiment of the present invention.

As shown in FIG. 1, a fuel cell stack 10 according to a first embodiment of the present invention is formed by stacking fuel cells 12 in a horizontal direction indicated by an arrow A or in a vertical direction indicated by an arrow C.

A first terminal plate 14a, a first insulating plate 16a, and a first end plate 18a are stacked on one end of the fuel cells 12 in the stacking direction. Further, a second terminal plate 14b, a second insulating plate 16b, and a second end plate 18b are stacked on the other end of the fuel cells 12 in the stacking direction.

Components between the first end plate 18a and the second end plate 18b each having a rectangular shape are tightened together by a plurality of tie-rods 19 extending in the direction indicated by the arrow A. Alternatively, components of the fuel cell stack 10 are held together by a box-shaped casing (not shown) including the first end plate 18a and the second end plate 18b.

Figure 2:
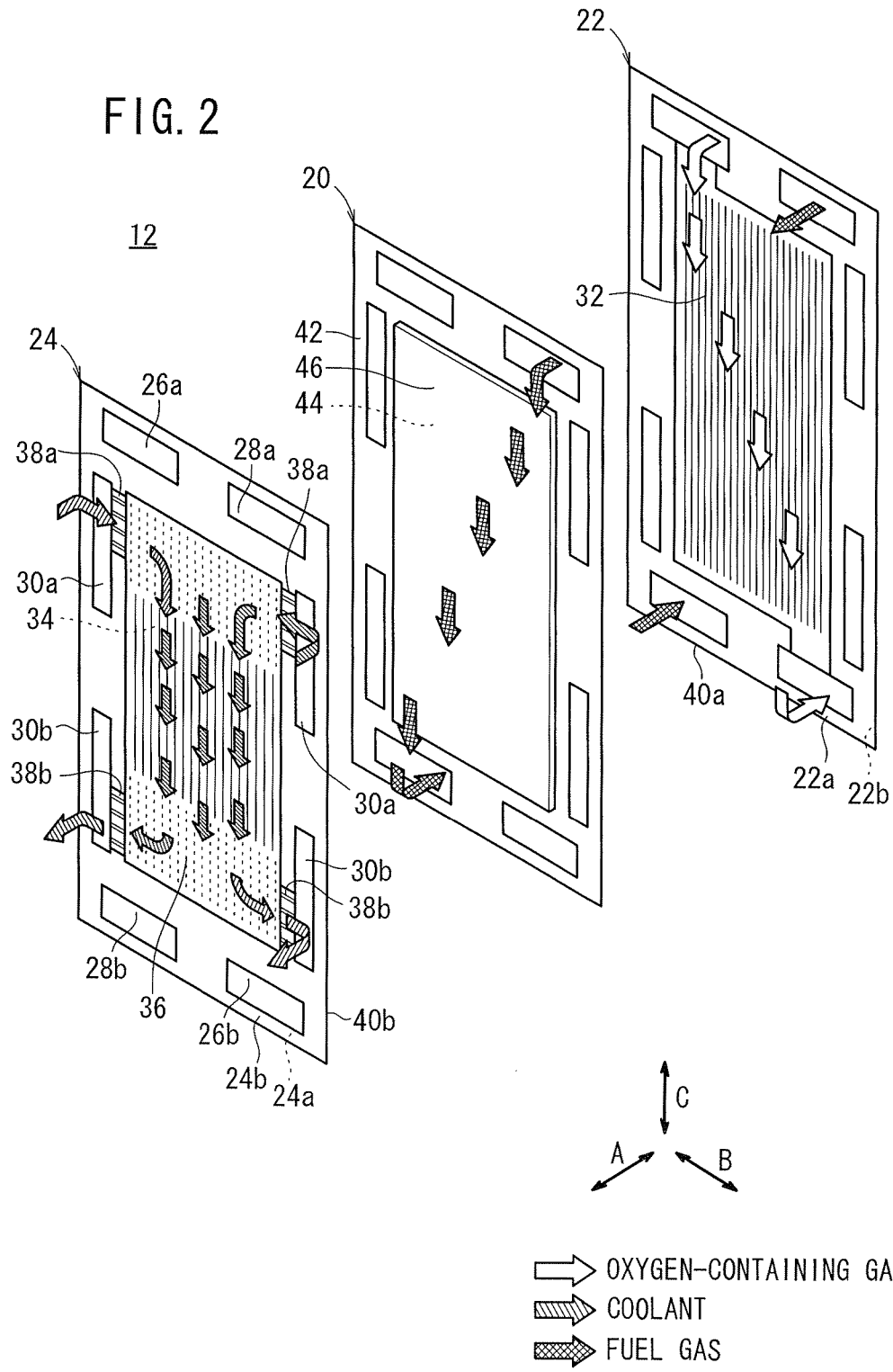
FIG. 2 is an exploded perspective view showing a fuel cell of the fuel cell stack.

As shown in FIG. 2, the fuel cell 12 is formed by stacking a membrane electrode assembly (electrolyte electrode assembly) 20 between first and second separators 22, 24. Carbon separators may be used as the first and second separators 22, 24. Alternatively, the first and second separators 22, 24 are metal separators of, e.g., steel plates, stainless steel plates, aluminum plates, or plated steel sheets.

At an upper end of the fuel cell 12 in the direction of gravity indicated by the arrow C in FIG. 2, an oxygen-containing gas supply passage 26a for supplying an oxygen-containing gas and a fuel gas supply passage 28a for supplying a fuel gas, for example, a hydrogen-containing gas are arranged in a horizontal direction indicated by an arrow B. The oxygen-containing gas supply passage 26a and the fuel gas supply passage 28a extend through the fuel cell 12 in the direction indicated by the arrow A.

At a lower end of the fuel cell 12 in the direction indicated by the arrow C, an oxygen-containing gas discharge passage 26b for discharging the oxygen-containing gas, and a fuel gas discharge passage 28b for discharging the fuel gas are arranged in the direction indicated by the arrow B. The oxygen-containing gas discharge passage 26b and the fuel gas discharge passage 28b extend through the fuel cell 12 in the direction indicated by the arrow A.

At both ends (two long sides) of the fuel cell 12 in the direction indicated by the arrow B, a pair of coolant supply passages 30a for supplying a coolant and a pair of coolant discharge passages 30b for discharging the coolant are arranged, for instance, at upper and lower positions.

The first separator 22 has an oxygen-containing gas flow field 32 on its surface 22a facing the membrane electrode assembly 20. The oxygen-containing gas flow field 32 is connected to the oxygen-containing gas supply passage 26a and the oxygen-containing gas discharge passage 26b.

The second separator 24 has a fuel gas flow field 34 on its surface 24a facing the membrane electrode assembly 20. The fuel gas flow field 34 is connected to the fuel gas supply passage 28a and the fuel gas discharge passage 28b.

A coolant flow field 36 is formed between a surface 22b of the first separator 22 of one of the adjacent fuel cells 12 and a surface 24b of the second separator 24 of the other of the adjacent fuel cells 12. The coolant flow field 36 is connected between the coolant supply passages 30a and the coolant discharge passages 30b. The coolant supply passages 30a are connected to the coolant flow field 36 through connection channels 38a, and the coolant discharge passages 30b are connected to the coolant flow field 36 through connection channels 38b.

A first seal member 40a is formed integrally with the surfaces 22a, 22b of the first separator 22. Alternatively, a member separate from the first separator 22 may be provided as the first seal member 40a provided on the surfaces 22a, 22b of the first separator 22. A second seal member 40b is formed integrally with the surfaces 24a, 24b of the second separator 24. Alternatively, a member separate from the second separator 24 may be provided as the second seal member 40b provided on the surfaces 24a, 24b of the second separator 24.

The membrane electrode assembly 20 includes a cathode 44, an anode 46, and a solid polymer electrolyte membrane (electrolyte) 42 interposed between the cathode 44 and the anode 46. The solid polymer electrolyte membrane 42 is formed by impregnating a thin membrane of perfluorosulfonic acid with water, for example.

Each of the cathode 44 and the anode 46 has a gas diffusion layer such as a carbon paper, and an electrode catalyst layer of platinum alloy supported on porous carbon particles. The carbon particles are deposited uniformly on the surface of the gas diffusion layer. The electrode catalyst layer of the cathode 44 and the electrode catalyst layer of the anode 46 are fixed to both surfaces of the solid polymer electrolyte membrane 42, respectively.

As shown in FIG. 1, a coolant supply manifold 50 is provided at an upper position on the outer surface of the first end plate 18a, and a coolant discharge manifold 52 is provided at a lower position on the outer surface of the first end plate 18a. Each of the coolant supply manifold 50 and the coolant discharge manifold 52 has a substantially U-shape which is opened downward.

Alternatively, for example, the coolant supply manifold 50 may be provided on the first end plate 18a, and for example, the coolant discharge manifold 52 may be provided on the second end plate 18b. Conversely, the coolant supply manifold 50 may be provided on the second end plate 18b, and the coolant discharge manifold 52 may be provided on the first end plate 18a.

Figure 3:
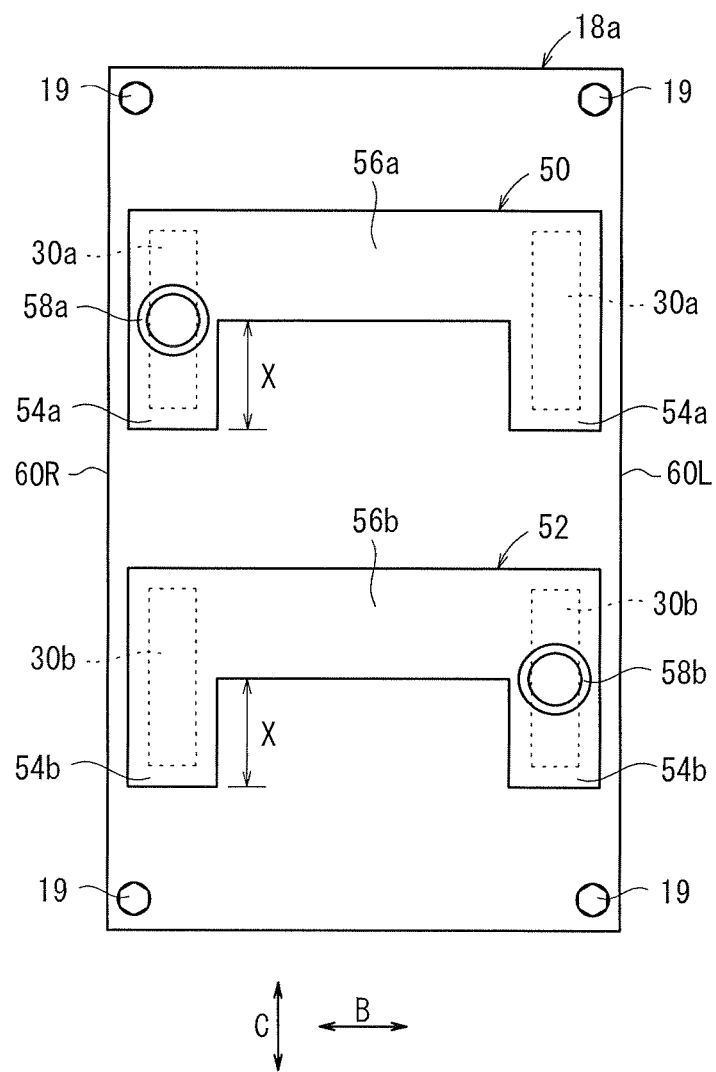
FIG. 3 is a front view showing a first end plate of the fuel cell stack.

As shown in FIGS. 1 and 3, the coolant supply manifold 50 includes a pair of supply manifold sections 54a and a supply coupling section 56a coupling upper portions of the pair of supply manifold sections 54a together. The pair of supply manifold sections 54a are connected to the pair of coolant supply passages 30a of the first end plate 18a. The width of the supply coupling section 56a (along the long sides in the longitudinal direction indicated by the arrow C) is smaller than the width of the pair of supply manifold sections 54a (along the long sides in the longitudinal direction indicated by the arrow C). The bottom surface of the supply coupling section 56a is spaced upward from the bottom surfaces of the supply manifold sections 54a by a distance X, which is described later (see FIG. 3). The supply manifold sections 54a have a rectangular parallelepiped shape elongated in the longitudinal direction along the long sides of the first end plate 18a indicated by the arrow C. A supply pipe (coolant inlet pipe) 58a extending to the outside of the first end plate 18a is formed integrally with one of the supply manifold sections 54a, at the center of the one of the supply manifold sections 54a in the direction indicated by the arrow C. The supply pipe 58a is provided adjacent to one long side 60R of the first end plate 18a, and connected to a coolant supply section (not shown).

The coolant discharge manifold 52 includes a pair of discharge manifold sections 54b and a discharge coupling section 56b coupling upper portions of the pair of discharge manifold sections 54b together. The pair of discharge manifold sections 54b are connected to the pair of coolant discharge passages 30b of the first end plate 18a. The width of the discharge coupling section 56b (along the long sides in the longitudinal direction indicated by the arrow C) is smaller than the width of the pair of discharge manifold sections 54b (along the long sides in the longitudinal direction indicated by the arrow C). The bottom surface of the discharge coupling section 56b is spaced upward from the bottom surfaces of the discharge manifold sections 54b by a distance X (described later). The distance X of the supply manifold sections 54a may be different from the distance X of the discharge manifold sections 54b.

The discharge manifold sections 54b have a rectangular parallelepiped shape elongated in the longitudinal direction along the long sides of the first end plate 18a indicated by the arrow C. A discharge pipe (coolant outlet pipe) 58b extending to the outside of the first end plate 18a is formed integrally with one of the discharge manifold sections 54b, at the center of the one of the discharge manifold sections 54b in the direction indicated by the arrow C, symmetrically with (diagonally to) the supply pipe 58a. The discharge pipe 58b is provided adjacent to the other long side 60L of the first end plate 18a, and connected to the coolant supply section (not shown). Alternatively, the supply pipe 58a may be provided adjacent to the other long side 60L and the discharge pipe 58b may be provided adjacent to the one long side 60R. This alternative arrangement may also apply to other embodiments of the present invention to be described later.

Though not shown, manifolds are provided on the second end plate 18b, corresponding to the oxygen-containing gas supply passage 26a, the oxygen-containing gas discharge passage 26b, the fuel gas supply passage 28a, and the fuel gas discharge passage 28b.

Next, operation of the fuel cell stack 10 will be described below.

Firstly, at the second end plate 18b, an oxygen-containing gas is supplied to the oxygen-containing gas supply passage 26a, and a fuel gas such as a hydrogen-containing gas is supplied to the fuel gas supply passage 28a.

Further, as shown in FIG. 1, at the first end plate 18a, a coolant such as pure water, ethylene glycol or oil is supplied to the coolant supply manifold 50 through the supply pipe 58a. Some of the coolant is supplied from one of the supply manifold sections 54a having the supply pipe 58a to the coolant supply passage 30a on one side, and the remaining coolant is supplied from the other supply manifold section 54a to the coolant supply passage 30a on the other side through the supply coupling section 56a.

In the structure, as shown in FIG. 2, the oxygen-containing gas flows from the oxygen-containing gas supply passage 26a into the oxygen-containing gas flow field 32 of the first separator 22. The oxygen-containing gas flows along the oxygen-containing gas flow field 32 in the direction of gravity indicated by the arrow C, and the oxygen-containing gas is supplied to the cathode 44 of the membrane electrode assembly 20.

The fuel gas flows from the fuel gas supply passage 28a into the fuel gas flow field 34 of the second separator 24. The fuel gas flows along the fuel gas flow field 34 in the direction of gravity indicated by the arrow C, and the fuel gas is supplied to the anode 46 of the membrane electrode assembly 20.

Therefore, in the membrane electrode assembly 20, the oxygen-containing gas supplied to the cathode 44 and the fuel gas supplied to the anode 46 are consumed in the electrochemical reactions at catalyst layers of the cathode 44 and the anode 46 for generating electricity.

Then, the oxygen-containing gas supplied to and partially consumed at the cathode 44 of the membrane electrode assembly 20 is discharged along the oxygen-containing gas discharge passage 26b in the direction indicated by the arrow A. The fuel gas supplied to and partially consumed at the anode 46 of the membrane electrode assembly 20 is discharged along the fuel gas discharge passage 28b in the direction indicated by the arrow A.

The coolant supplied to the two coolant supply passages 30a flows into the coolant flow field 36 formed between the first separator 22 and the second separator 24. The coolant moves in the direction indicated by the arrow C to cool the membrane electrode assembly 20, and then, the coolant is discharged from the two coolant discharge passages 30b to the pair of discharge manifold sections 54b of the coolant discharge manifold 52.

As shown in FIG. 1, the coolant discharged to one of the discharge manifold sections 54b is discharged to the outside directly through the discharge pipe 58b. The coolant discharged to the other of the discharge manifold sections 54b flows through the discharge coupling section 56b, and flows into the one of the discharge manifold sections 54b. Then, the coolant is discharged to the outside through the discharge pipe 58b.

In the first embodiment, as shown in FIG. 3, the coolant supply manifold 50 includes the pair of supply manifold sections 54a and the narrow supply coupling section 56a formed integrally with the supply manifold sections 54a. The supply pipe 58a is provided on one of the supply manifold sections 54a. Further, the coolant discharge manifold 52 includes the pair of discharge manifold sections 54b and the narrow discharge coupling section 56b formed integrally with the discharge manifold sections 54b. The discharge pipe 58b is provided on one of the discharge manifold sections 54b diagonally to the supply pipe 58a.

The bottom surface of the supply coupling section 56a is spaced upward from the bottom surfaces of the supply manifold sections 54a by the distance X, and the bottom surface of the discharge coupling section 56b is spaced upward from the bottom surfaces of the discharge manifold sections 54b by the distance X.

Figure 4:
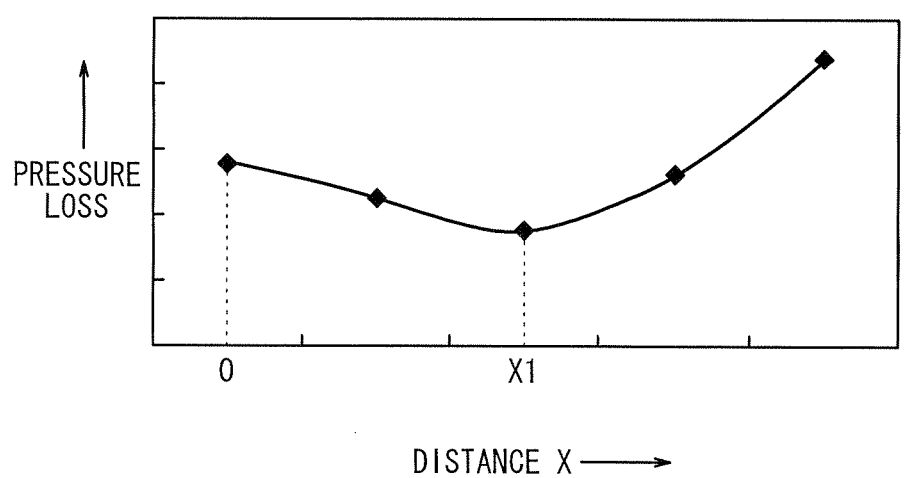
FIG. 4 is a graph showing the relationship between the width of a coupling section and the pressure loss.

FIG. 4 is a graph showing the relationship between the pressure loss of the coolant from the supply pipe 58a to the discharge pipe 58b and the distance X. As can be seen from the graph, when the distance X is 0, i.e., in the case where the coolant supply manifold 50 (and the coolant discharge manifold 52) has a quadrangular shape (a rectangular shape), the inner volume of the coolant supply manifold 50 is considerably large. Therefore, when the coolant is supplied from the supply pipe 58a into the coolant supply manifold 50, the flow rate of the coolant is reduced significantly, and the pressure loss of the coolant is increased considerably.

In the case where the distance X is increased, since the inner volumes of the coolant supply manifold 50 and the coolant discharge manifold 52 are decreased, the pressure loss in the coolant supply manifold 50 and the coolant discharge manifold 52 is decreased. Further, in the case where the distance X exceeds X1, the flow field cross sectional areas in the supply coupling section 56a and the discharge coupling section 56b are reduced, and the pressure loss is increased.

Therefore, when the distance X is X1, the pressure loss in the coolant supply manifold 50 and the coolant discharge manifold 52 is decreased as much as possible. Thus, with the simple structure, it becomes possible to achieve the smooth and reliable flow of the coolant.

Further, in the first embodiment, as shown in FIG. 3, the coolant supply manifold 50 connected to the pair of coolant supply passages 30a and the coolant discharge manifold 52 connected to the pair of coolant discharge passages 30b are arranged along the long sides of the first end plate 18a. The supply pipe 58a is provided on the coolant supply manifold 50 adjacent to the one long side 60R of the first end plate 18a, and the discharge pipe 58b is provided on the coolant discharge manifold 52 adjacent to the other long side 60L of the first end plate 18a.

In the structure, the pair of coolant supply passages 30a have the same pressure loss, and the pair of coolant discharge passages 30b have the same pressure loss.

Figure 5:
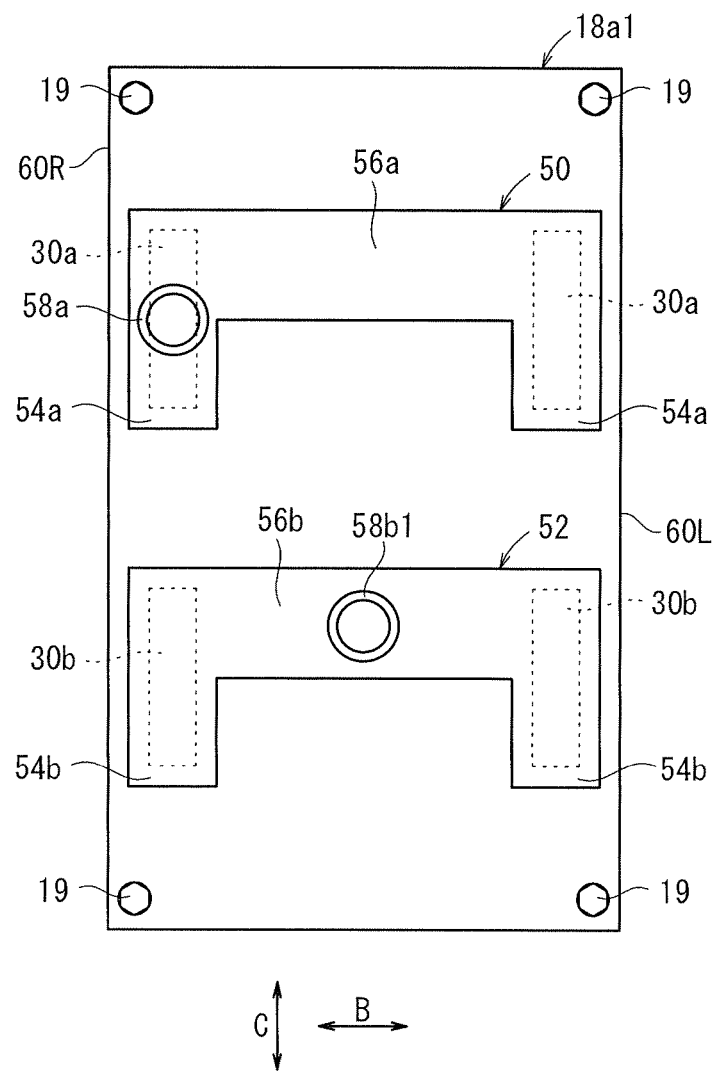
FIG. 5 is a front view showing a first end plate according to a first comparative example.
Figure 6:
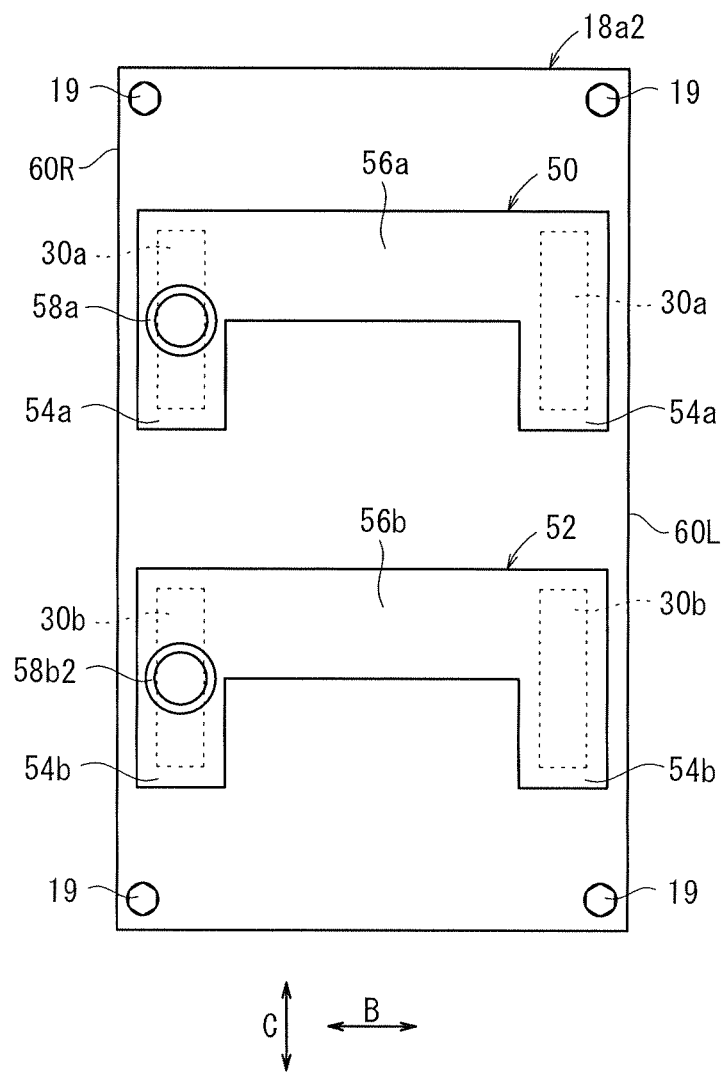
FIG. 6 is a front view showing a first end plate according to a second comparative example.

Specifically, flow rates in the cases of the first end plate 18a (see FIG. 3) used in the first embodiment, a first end plate 18a1 as a first comparative example shown in FIG. 5, and a first end plate 18a2 as a second comparative example shown in FIG. 6 were compared one another.

In the first end plate 18a1 shown in FIG. 5, a discharge pipe 58b1 is provided at the center of the discharge coupling section 56b of the coolant discharge manifold 52. In the first end plate 18a2 shown in FIG. 6, a discharge pipe 58b2 is provided on the discharge manifold section 54b of the coolant discharge manifold 52, adjacent to the one long side 60R.

Figure 7:
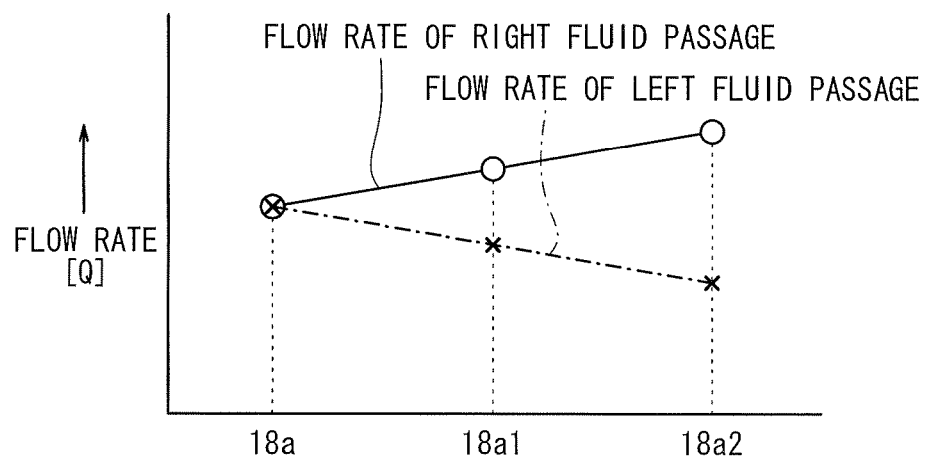
FIG. 7 is a graph showing flow rates in right fluid passage and left fluid passage according to the first embodiment, the first comparative example, and the second comparative example.

FIG. 7 shows results of detecting the flow rates in the right fluid passage (flow rate in the coolant supply passage 30a and the coolant discharge passage 30b on one side 60R) and left fluid passage (flow rate in the coolant supply passage 30a and the coolant discharge passage 30b on the other side 60L) in each of the first end plates 18a, 18a1, and 18a2.

In the first end plate 18a1, since the discharge pipe 58b1 is provided at the center of the coolant discharge manifold 52, the flow rate in the right fluid passage is larger than the flow rate in the left fluid passage. Further, in the first end plate 18a2, since the supply pipe 58a and the discharge pipe 58b2 are provided adjacent to the same side 60R, the flow rate in the right fluid passage is considerably larger than the flow rate in the left fluid passage.

In contrast, in the first embodiment, since the supply pipe 58a and the discharge pipe 58b are provided at symmetrical positions of the first end plate 18a, the flow rate in the right fluid passage and the flow rate in the left fluid passage are maintained to be the same. That is, the pair of coolant supply passages 30a have the same pressure loss, the pair of coolant discharge passages 30b have the same pressure loss, and the same flow rate allocation is maintained in each of the pair of coolant supply passages 30a and the pair of coolant discharge passages 30b. In the structure, the uniform temperature distribution in the surfaces of the fuel cells 12 is achieved, and improvement in the power generation performance of the fuel cells 12 is achieved easily.

Figure 8:
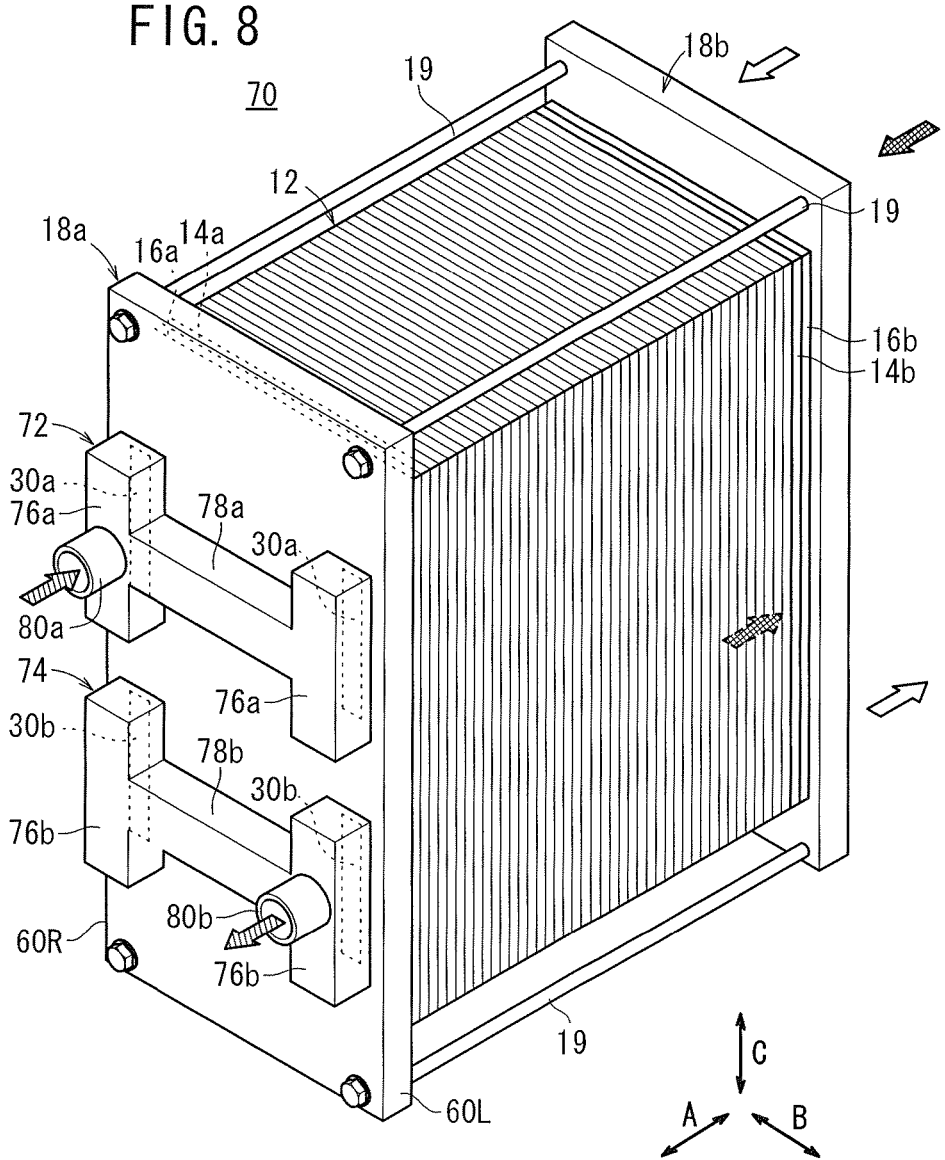
FIG. 8 is a perspective view schematically showing a fuel cell stack according to a second embodiment of the present invention.

FIG. 8 is a perspective view with partial omission of a fuel cell stack 70 according to a second embodiment of the present invention.

The constituent elements that are identical to those of the fuel cell stack 10 according to the first embodiment are labeled with the same reference numerals, and detailed descriptions thereof will be omitted. Also, in third or further embodiments described later, the constituent elements that are identical to those of the fuel cell stack 10 according to the first embodiment are labeled with the same reference numerals, and detailed descriptions thereof will be omitted.

The fuel cell stack 70 includes a coolant supply manifold 72 and a coolant discharge manifold 74 provided on the outer surface of the first end plate 18a. Each of the coolant supply manifold 72 and the coolant discharge manifold 74 has substantially an H-shape.

The coolant supply manifold 72 includes a pair of longitudinally elongated supply manifold sections 76a and a supply coupling section 78a coupling substantially central portions of the pair of supply manifold sections 76a together. The pair of supply manifold sections 76a are connected to the pair of coolant supply passages 30a of the first end plate 18a. The width of the supply coupling section 78a (along the long sides in the longitudinal direction indicated by the arrow C) is smaller than the width of the pair of supply manifold sections 76a (along the long sides in the longitudinal direction indicated by the arrow C). A supply pipe 80*a* is formed integrally with one of the supply manifold sections 76*a*, at the center of the one of the supply manifold sections 76*a* in the direction indicated by the arrow C. The supply pipe 80*a* extends to the outside of the first end plate 18*a*.

The coolant discharge manifold 74 includes a pair of discharge manifold sections 76*b* and a discharge coupling section 78*b* coupling substantially central portions of the pair of discharge manifold sections 76*b* together. The pair of discharge manifold sections 76*b* are connected to the pair of coolant discharge passages 30*b*. The width of the discharge coupling section 78*b* (along the long sides in the longitudinal direction indicated by the arrow C) is smaller than the width of the pair of discharge manifold sections 76*b* (along the long sides in the longitudinal direction indicated by the arrow C). A discharge pipe 80*b* is formed integrally with one of the discharge manifold sections 76*b*, at the center of the one of the discharge manifold sections 76*b* in the direction indicated by the arrow C, symmetrically with (diagonally to) the supply pipe 80*a*. The discharge pipe 80*b* extends to the outside of the first end plate 18*a*.

In the second embodiment, each of the coolant supply manifold 72 and the coolant discharge manifold 74 has substantially the H-shape. Thus, in the second embodiment, the same advantages as in the case of the first embodiment having the coolant supply manifold 50 and the coolant discharge manifold 52 each having substantially the U-shape are provided.

Further, in the second embodiment, the supply pipe 80*a* of the coolant supply manifold 72 and the discharge pipe 80*b* of the coolant discharge manifold 74 are provided at symmetrical positions. Also in this respect, in the second embodiment, the same advantages as in the case of the first embodiment having the supply pipe 58*a* and the discharge pipe 58*b* provided at symmetrical positions are obtained.

Figure 9:
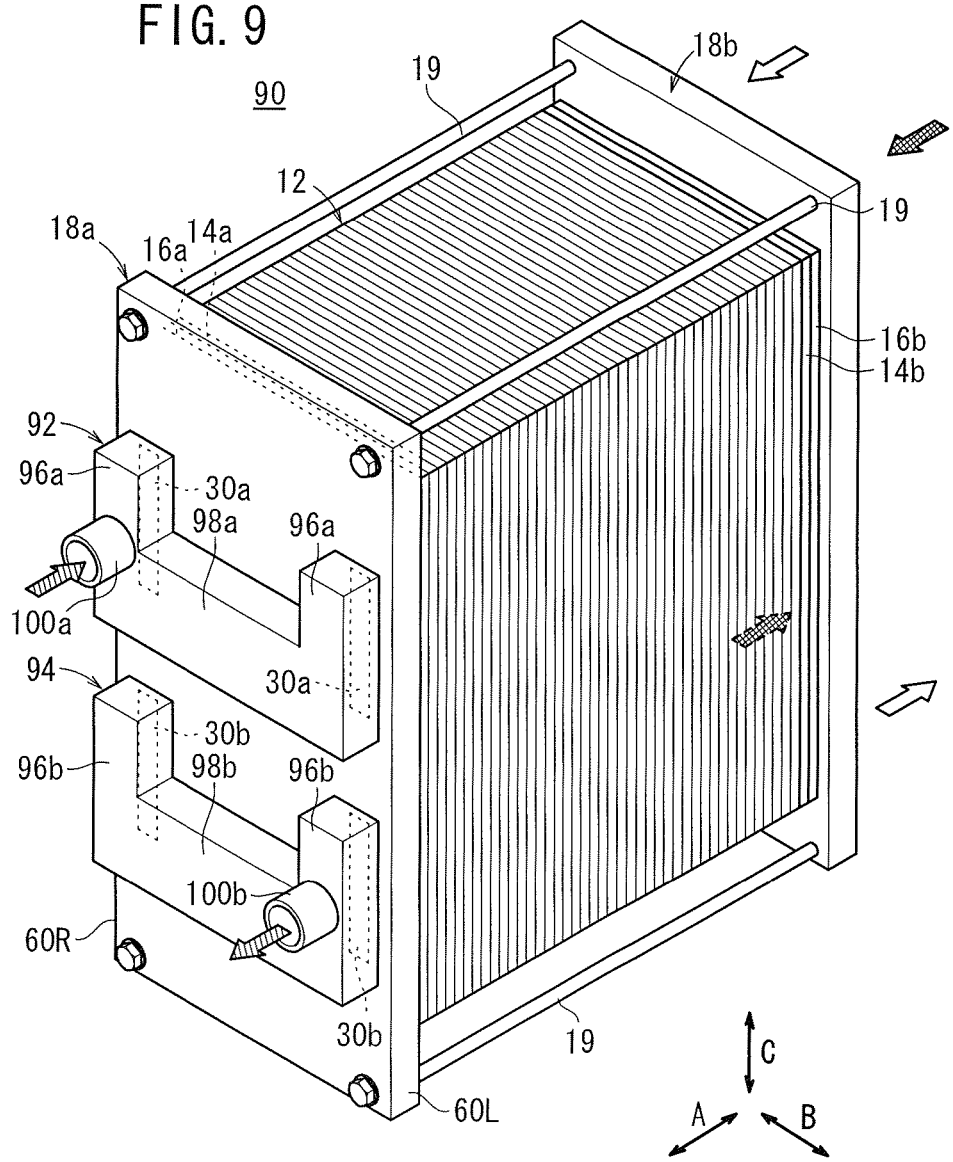
FIG. 9 is a perspective view schematically showing a fuel cell stack according to a third embodiment of the present invention.

FIG. 9 is a perspective view with partial omission of a fuel cell stack 90 according to a third embodiment of the present invention.

The fuel cell stack 90 includes a coolant supply manifold 92 and a coolant discharge manifold 94 provided on the other surface of the first end plate 18*a*. Each of the coolant supply manifold 92 and the coolant discharge manifold 94 has a substantially U-shape which is opened upward.

The coolant supply manifold 92 includes a pair of longitudinally elongated supply manifold sections 96*a* and a supply coupling section 98*a* coupling lower portions of the pair of supply manifold sections 96*a* together. The pair of supply manifold sections 96*a* are connected to the pair of coolant supply passages 30*a*. The width of the supply coupling section 98*a* (along the long sides in the longitudinal direction indicated by the arrow C) is smaller than the width of the pair of supply manifold sections 96*a* (along the long sides in the longitudinal direction indicated by the arrow C). A supply pipe 100*a* is formed integrally with one of the supply manifold sections 96*a*, at the center of the one of the supply manifold sections 96*a* in the direction indicated by the arrow C. The supply pipe 100*a* extends to the outside of the first end plate 18*a*.

The coolant discharge manifold 94 includes a pair of discharge manifold sections 96*b* and a discharge coupling section 98*b* coupling lower portions of the pair of discharge manifold sections 96*b* together. The pair of discharge manifold sections 96*b* are connected to the pair of coolant discharge passages 30*b* of the first end plate 18*a*. The width of the discharge coupling section 98*b* (along the long sides in the longitudinal direction indicated by the arrow C) is smaller than the width of the pair of discharge manifold sections 96*b* (along the long sides in the longitudinal direction indicated by the arrow C). A discharge pipe 100*b* is formed integrally with one of the discharge manifold sections 96*b*, at the center of the one of the discharge manifold sections 96*b* in the direction indicated by the arrow C, symmetrically with (diagonally to) the supply pipe 100*a*. The discharge pipe 100*b* extends to the outside of the first end plate 18*a*.

In the third embodiment, each of the coolant supply manifold 92 and the coolant discharge manifold 94 has substantially the U-shape which is opened upward. Thus, in the third embodiment, the same advantages as in the case of the first embodiment having the coolant supply manifold 50 and the coolant discharge manifold 52 each having substantially the U-shape which is opened downward and as in the case of the second embodiment having the coolant supply manifold 72 and the coolant discharge manifold 74 each having substantially the H-shape are provided.

Further, in the third embodiment, the supply pipe 100*a* of the coolant supply manifold 92 and the discharge pipe 100*b* of the coolant discharge manifold 94 are provided at symmetrical positions. Also in this respect, in the third embodiment, the same advantages as in the cases of the first embodiment and the second embodiment are obtained.

Figure 10:
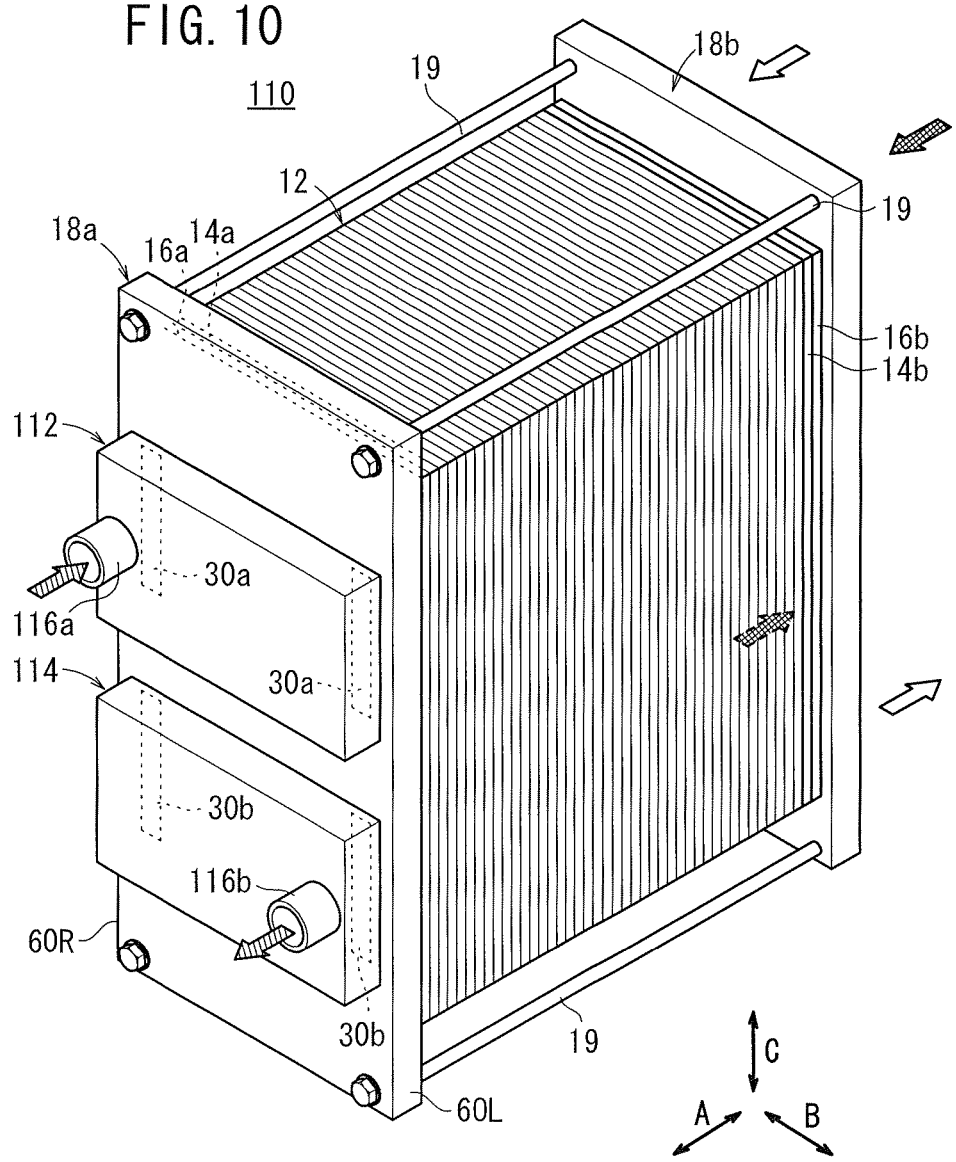
FIG. 10 is a perspective view schematically showing a fuel cell stack according to a fourth embodiment of the present invention.

FIG. 10 is a perspective view with partial omission of a fuel cell stack 110 according to a fourth embodiment of the present invention.

The fuel cell stack 110 includes a coolant supply manifold 112 and a coolant discharge manifold 114 provided on the outer surface of the first end plate 18*a*. The coolant supply manifold 112 has a rectangular shape, and is connected to a pair of coolant supply passages 30*a* of the first end plate 18*a*. A supply pipe 116*a* is provided adjacent to one long side 60R. The coolant discharge manifold 114 has a rectangular shape, and is connected to a pair of coolant discharge passages 30*b*. A discharge pipe 116*b* is provided adjacent to the other long side 60L, i.e., symmetrically with (diagonally to) the supply pipe 116*a*.

In the fourth embodiment, the supply pipe 116*a* of the coolant supply manifold 112 and the discharge pipe 116*b* of the coolant discharge manifold 114 are provided at symmetrical positions. Therefore, the same advantages as in the cases of the first to third embodiments are obtained.

Figure 11:
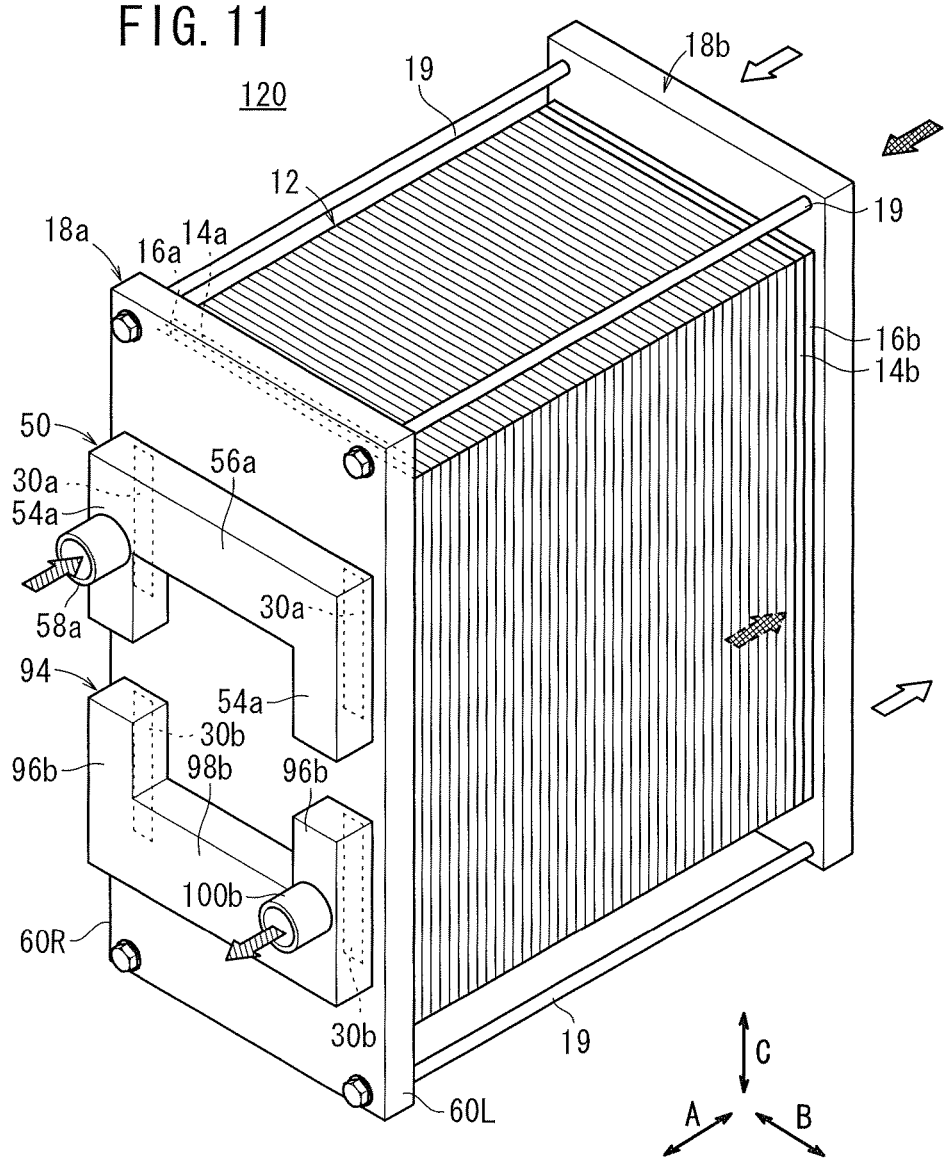
FIG. 11 is a perspective view schematically showing a fuel cell stack according to a fifth embodiment of the present invention.
Figure 12:
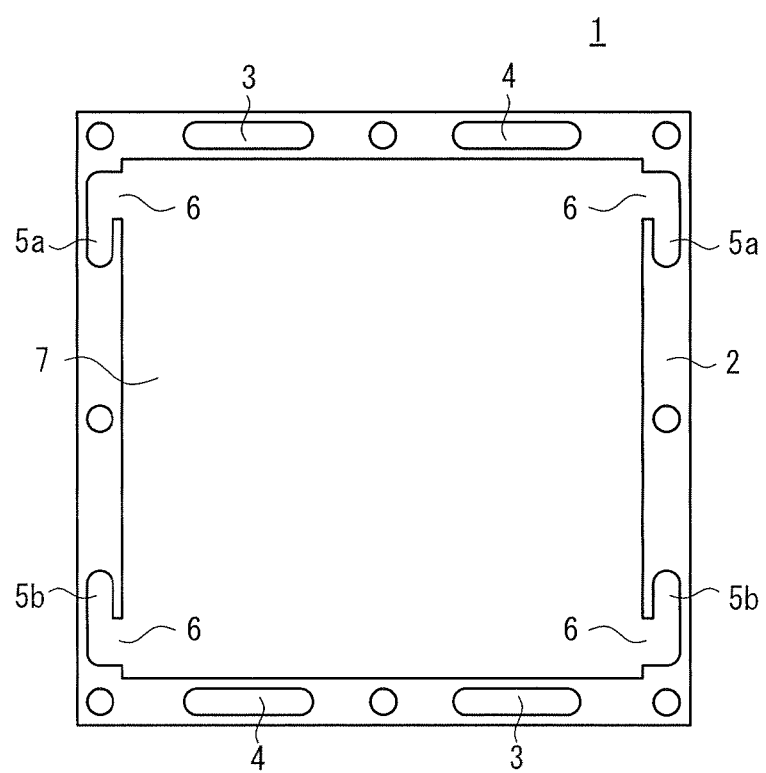
FIG. 12 is a view showing a spacer disclosed in Japanese Laid-Open Patent Publication No. 2000-260439.

FIG. 11 is a perspective view with partial omission of a fuel cell stack 120 according to a fifth embodiment of the present invention.

The fuel cell stack 120 includes a coolant supply manifold 50 and a coolant discharge manifold 94 provided on the outer surface of the first end plate 18*a*. The coolant supply manifold 50 has a substantially U-shape which is opened downward, and the coolant discharge manifold 94 has a substantially U-shape which is opened upward.

The coolant supply manifold 50 has a supply pipe 58*a* in a supply manifold section 54*a* adjacent to one long side 60R. The coolant discharge manifold 94 has a discharge pipe 100*b* in a discharge manifold section 96*b* adjacent to the other long side 60L.

In the fifth embodiment, the supply pipe 58*a* and the discharge pipe 100*b* are provided at symmetrical positions. Therefore, the same advantages as in the cases of the first to fourth embodiments are obtained.

Further, in the fifth embodiment, by inverting the coolant supply manifold 50 by 180°, the coolant supply manifold 50 can be used as the coolant discharge manifold 94. The single type of the manifold can be used for both of the coolant supply manifold 50 and the coolant discharge manifold 94. The same component can be used for parts at different positions economically.

While the invention has been particularly shown and described with reference to preferred embodiments, it will be understood that variations and modifications can be effected thereto by those skilled in the art without departing from the spirit of the invention as defined by the appended claims.

What is claimed is:

1. A fuel cell stack formed by stacking an electrolyte electrode assembly and a separator in a stacking direction, the electrolyte electrode assembly including a pair of electrodes and an electrolyte interposed between the electrodes, rectangular end plates being provided at both ends of the fuel cell stack in the stacking direction, the fuel cell stack comprising a pair of coolant supply passages and a pair of coolant discharge passages extending through two opposite long sides of the fuel cell stack in the stacking direction as passages of a coolant, one of the end plates including:

a pair of manifold sections connected to at least any of the pair of coolant supply passages and the pair of coolant discharge passages; and a coupling section for coupling the pair of manifold sections together, the width of the coupling section along the long sides being smaller than the width of the pair of manifold sections along the long sides.

2. A fuel cell stack according to claim 1, wherein the end plate includes:

a pair of supply manifold sections as the pair of manifold sections connected to the coolant supply passages;

a supply coupling section as the coupling section coupling the pair of supply manifold sections together;

a pair of discharge manifold sections as the pair of manifold sections connected to the coolant discharge passages; and a discharge coupling section as the coupling section connecting the pair of discharge manifold sections together.

3. A fuel cell stack according to claim 2, wherein a supply pipe extending to the outside of the end plate is provided on one of the pair of supply manifold sections; and a discharge pipe extending to the outside of the end plate is provided on the pair of discharge manifold sections, diagonally to the supply pipe.

4. A fuel cell stack formed by stacking an electrolyte electrode assembly and a separator in a stacking direction, the electrolyte electrode assembly including a pair of electrodes and an electrolyte interposed between the electrodes, rectangular end plates being provided at both ends of the fuel cell stack in the stacking direction, the fuel cell stack comprising a pair of coolant supply passages and a pair of coolant discharge passages extending through two opposite sides of the fuel cell stack in the stacking direction as passages of a coolant, wherein:

one of the pair of coolant supply passages and one of the pair of coolant discharge passages are located on and extend through a first side of the fuel cell stack, and the other of the pair of coolant supply passages and the other of the pair of coolant discharge passages are located on and extend through a second side, opposite from the first side, of the fuel cell stack;

one of the end plates includes a coolant supply manifold connected to the pair of coolant supply passages and a coolant discharge manifold connected to the pair of coolant discharge passages, the coolant supply manifold and the coolant discharge manifold spanning between the first side and the second side of the fuel cell stack;

a coolant inlet pipe for supplying the coolant into the coolant supply manifold is provided on the coolant supply manifold adjacent to the first side of the fuel stack; and a coolant outlet pipe for discharging the coolant from the coolant discharge manifold is provided on the coolant discharge manifold adjacent to the second side of the fuel stack.

5. A fuel cell stack according to claim 4, the coolant inlet pipe and the coolant outlet pipe are provided at symmetrical positions in a surface of the end plate.

* * * * *